(12) United States Patent
Nguyen (10) Patent No.: US 11,442,809 B1
(45) Date of Patent: Sep. 13, 2022

(54) DOUBLE-PARITY RAID ENABLING RECOVERY OF TWO FAILED DATA UNITS

(71) Applicant: Marvell Asia Pte, Ltd., Singapore (SG)

(72) Inventor: Phong Sy Nguyen, Livermore, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 195 days.

(21) Appl. No.: 16/932,320

(22) Filed: Jul. 17, 2020

Related U.S. Application Data (60) Provisional application No. 62/875,432, filed on Jul. 17, 2019.

(51) Int. Cl.
*G06F 11/10* (2006.01)
*G06F 3/06* (2006.01)
*G06F 11/14* (2006.01)

(52) U.S. Cl.
CPC ........ *G06F 11/1076* (2013.01); *G06F 3/0619* (2013.01); *G06F 3/0653* (2013.01); *G06F 3/0689* (2013.01); *G06F 11/1044* (2013.01); *G06F 11/1471* (2013.01)

(58) Field of Classification Search
CPC .......................... G06F 11/1044; G06F 11/1076
USPC ....................................................... 714/6.24
See application file for complete search history.

(56) References Cited

U.S. PATENT DOCUMENTS

| | | | | |
|---|---|---|---|---|
| 2006/0218470 | A1* | 9/2006 | Dickson | H03M 13/1575 714/767 |
| 2009/0172335 | A1* | 7/2009 | Kulkarni | G06F 3/064 711/170 |
| 2010/0125695 | A1* | 5/2010 | Wu | G06F 12/084 711/E12.083 |
| 2014/0064048 | A1* | 3/2014 | Cohen | G06F 3/0613 369/47.15 |
| 2015/0169237 | A1* | 6/2015 | Ioannou | G06F 12/0246 711/103 |
| 2016/0170870 | A1* | 6/2016 | Camp | G06F 12/0246 711/103 |
| 2016/0179410 | A1* | 6/2016 | Haas | G06F 3/0616 714/6.24 |
| 2017/0093440 | A1* | 3/2017 | Camp | G06F 11/1076 |
| 2017/0139768 | A1* | 5/2017 | Camp | G06F 3/0647 |
| 2017/0220410 | A1* | 8/2017 | Kim | G06F 11/1072 |
| 2018/0267893 | A1* | 9/2018 | Barzik | G06F 12/0246 |
| 2019/0050148 | A1* | 2/2019 | Jain | G06F 3/0685 |
| 2019/0129803 | A1* | 5/2019 | Sakdeo | G06F 11/1451 |
| 2020/0104071 | A1* | 4/2020 | Sallese | G06F 3/0658 |

(Continued)

FOREIGN PATENT DOCUMENTS

CN 110196687 A * 9/2019

*Primary Examiner* — Chae M Ko (57) ABSTRACT

User data units are received at a memory controller to be written to a RAID strip in non-volatile memory. A first parity value is calculated for the user data units using a first parity calculation. A second parity value different from the first parity value is also calculated for the plurality of user data units using a second parity calculation. The first parity value is stored in a first parity data unit in the non-volatile memory and the second parity value is stored in a second parity data unit in the non-volatile memory. Recovery from a failure of up to two data units thus enabled by recalculating the value of the failed data units based on one or more of the first parity data unit, the second parity data unit, and the values of other user data units of the plurality of data units.

18 Claims, 9 Drawing Sheets

(56) References Cited

U.S. PATENT DOCUMENTS

| 2021/0004158 A1* | 1/2021 | Pletka | G06F 3/061 |
| 2021/0011852 A1* | 1/2021 | Pletka | G06F 12/0868 |
| 2022/0091771 A1* | 3/2022 | Freilich | G06F 3/067 |

* cited by examiner

DOUBLE-PARITY RAID ENABLING RECOVERY OF TWO FAILED DATA UNITS

CROSS-REFERENCE TO RELATED APPLICATION

This disclosure claims the benefit under 35 U.S.C. § 119(e) of U.S. Provisional Patent Application No. 62/875,432, filed Jul. 17, 2019, which is hereby incorporated by reference herein in its entirety.

FIELD OF USE

This disclosure relates to non-volatile memory controllers, and particularly recovering lost or corrupted data units from the non-volatile memory.

BACKGROUND OF THE DISCLOSURE

The background description provided herein if for the purpose of generally presenting the context of the disclosure. Work of the inventors hereof, to the extent the work is described in this background section, as well as aspects of the description that do not otherwise qualify as prior art at the time of filing, are neither expressly nor impliedly admitted to be prior art against the present disclosure.

In computer systems, data is commonly stored in a solid-state drive (SSD) containing NAND Flash memory or other non-volatile memory. SSD controllers often implement a redundant array of independent disks (RAID) feature in order to enable recovery of a data unit, or allocation unit, in the event of failure of any given data unit in the non-volatile memory. As non-volatile memory becomes more densely packed into a single chip, opportunities for failures caused by word line faults and/or short circuits increase. Conventional RAID implementations use one parity value per RAID stripe to enable recovery from a failure of one data unit but cannot recover from a simultaneous failure of two data units.

SUMMARY

User data units are received at a memory controller to be written to a RAID strip in non-volatile memory. A first parity value is calculated for the user data units using a first parity calculation which includes a first series of operations. A second parity value different from the first parity value is also calculated for the plurality of user data units using a second parity calculation that includes a second series of operations. The first parity value is then stored in a first parity data unit in the non-volatile memory and the second parity value is stored in a second parity data unit in the non-volatile memory. Recovery from a failure of up to two data units from among the plurality of user data units and the first and second parity data units is thus enabled by recalculating the value of the failed data units based on one or more of the first parity data unit, the second parity data unit, and the values of other user data units of the plurality of data units.

In some implementations, the plurality of user data units are retrieved from the non-volatile memory and decoded using an ECC decoder. The memory controller may determine whether each user data unit was successfully decoded. If a user data unit was successfully decoded, the memory controller updates a first parity buffer based on the respective user data unit using the first parity calculation and updates a second parity buffer based on the respective user data unit using the second parity calculation. If the user data unit was not successfully decoded, then the first parity data unit and second parity data unit are retrieved from the non-volatile memory. The failed user data unit is then recovered by recalculating the value of the failed data unit based on at least one of the first parity data unit and the second parity data unit.

In some implementations, the memory controller decodes the first parity data unit using an ECC decoder and determines whether the first parity data unit was successfully decoded. The memory controller also decodes the second parity data unit using the ECC decoder and determine whether the second parity data unit was successfully decoded. If the first parity data unit was not successfully decoded and the second parity data unit was successfully decoded, the memory controller calculates auxiliary second parity data from the values of user data units of the plurality of user data units that have been successfully decoded and recovers the failed user data unit based on the second parity data unit and the auxiliary second parity data. The memory controller then recovers the first parity data unit based on the recovered user data unit and the remaining data units of the plurality of data units.

In some implementations, the memory controller decodes the first parity data unit using an ECC decoder and determines whether the first parity data unit was successfully decoded. The memory controller also decodes the second parity data unity using the ECC decoder and determines whether the second parity data unit was successfully decoded. If the first parity data unit was successfully decoded and the second parity data unit was not successfully decoded, the memory controller recovers the failed user data unit based on the first parity data unit, and then recovers the second parity data unit based on the recovered user data unit and the remaining user data units of the plurality of user data units.

In some implementations, in response to determining that a second user data unit of the plurality of user data units was not successfully decoded, the memory controller calculates auxiliary first parity data using the first parity calculation and auxiliary second parity data using the second parity calculation. The memory controller then calculates a first scaling factor for the auxiliary first parity data and a second scaling factor for the auxiliary second parity data. The second user data unit is recovered based on the first parity data unit, the auxiliary first parity data, the first scaling factor, the second parity data unit, the auxiliary second parity data, and the second scaling factor. The first user data unit is then recovered based on the recovered second user data unit, the first parity data unit, and the auxiliary first parity data.

In some implementations, retrieving the first parity data unit from the non-volatile memory and retrieving the second parity data unit from the non-volatile memory occurs only after all user data units of the plurality of user data units have been retrieved.

In some implementations, the first parity calculation is a sum of all user data units of the plurality of user data units. In some implementations, the second parity calculation is a polynomial function, wherein each user data unit is multiplied by an intermediate value. The polynomial function may be evaluated using Horner's Method.

BRIEF DESCRIPTION OF THE DRAWINGS

Further features of the disclosure, its nature and various advantages will become apparent upon consideration of the following detailed description, taken in conjunction with the accompanying drawings, in which like reference characters refer to like parts throughout, and in which.

DETAILED DESCRIPTION

Typical memory controllers encode incoming data units for storage in non-volatile memory, such as NAND Flash memory. Memory controllers typically store the encoded data units it a particular location, or stripe, within the non-volatile memory. The stripe can hold a particular number of data units. A single parity value is calculated for the set of data units that fill the stripe to enable recovery of any single failed data unit.

Conventional systems can thus only recover from a failure of one data unit. As non-volatile memory manufacturing processes advance, the number of memory locations or word lines that fit in a given space increases. However, as memory locations become more tightly packed, the potential for failures caused by open word lines and short circuits during write operations increases as well. This results in a greater likelihood that more than one data unit will fail at the same time. Due to the use of only a single parity value, conventional memory controllers are unable to recover from a failure of more than one data unit at a time.

Implementations of the subject matter of the present disclosure enable a memory controller to recover from up to two failed data units. Specifically, the subject matter of the present disclosure provides a way to calculate two different parity values for each set of data units, and to use the two parity values to recover up to two failed data units in the set of data units. This allows recovery from up to two simultaneous failures in the same RAID stripe, whereas a single parity value allows only for recovery of a single failure. If there is a failure of one of the parity values, the other parity value, in combination with the valid data units, can be used to recover both the failed data unit and the failed parity value. If both parity values fail, the data units can be used to recalculate the parity values.

Some implementations of the subject matter of the present disclosure provide a double-parity RAID scheme based on Reed Solomon codes, which operate on a set of data units, treating them as a finite field, or Galois Field (GF). This set of data units may be referred to as a RAID stripe. For a given Galois Field GF(m), the maximum number of data units within a RAID stripe will be m−1. For example, a finite field GF(100) can support up to 99 data units in a RAID stripe. In some implementations, a Galois Field GF($2^m$) is used. As will be described further below, using a Galois Field GF($2^m$) may simplify certain mathematical calculations.

Figure 1:
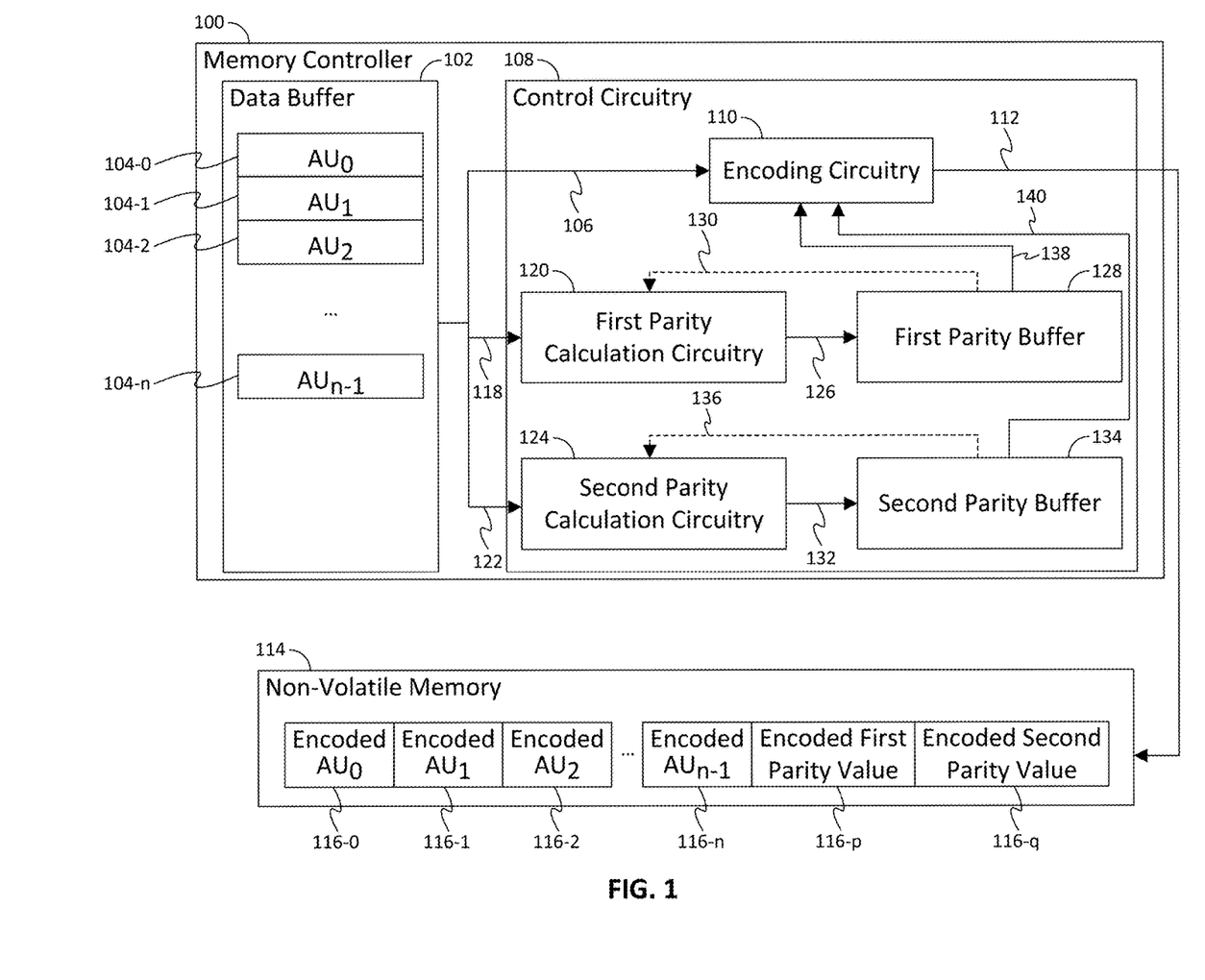
FIG. 1 is a block diagram illustrating components of a memory controller and data flow to, from, and within the memory controller for forming a RAID stripe from a set of data units and calculating parity values for the set of data units, in accordance with some implementations of the subject matter of the present disclosure.

FIG. 1 is a block diagram illustrating components of a memory controller and data flow to, from, and within the memory controller for forming a RAID stripe from a set of data units and calculating parity values for the set of data units in accordance with some implementations of the subject matter of the present disclosure. Memory controller 100 includes data buffer 102, in which received user data units (sometimes referred to as allocation units) 104-0, 104-1, 104-2, . . . 104-*n* are temporarily stored. User data units are transmitted, at 106, to control circuitry 108. Encoding circuitry 110 encodes the user data units for storage, and transmits, at 112, the encoded user data units to non-volatile memory 114 where they are stored as encoded user data units 116-0, 116-1, 116-2, . . . 116-*n*. Encoding circuitry 110 suitably is an error correction code (ECC) encoder, a cyclic redundancy check (CRC) module, or any other suitable memory encoding circuitry.

As each user data unit is transmitted to encoding circuitry 110, it is also transmitted, at 118, to first parity calculation circuitry 120 and transmitted, at 122, to second parity calculation circuitry 124. First parity calculation circuitry 120 calculates a first parity value using a first set of operations and transmits, at 126, the first parity value to first parity buffer 128. First parity buffer 128 is initialized with a value of '0' upon receipt of the first user data unit. As first parity calculation circuitry 120 receives each user data unit, the current value stored in first parity buffer 128 is transmitted, at 130, to first parity calculation circuitry 120. First parity calculation circuitry 120 receives the current value from the first parity buffer, and updates the calculated value based on the current user data unit. The calculated value is then transmitted, at 126, back to first parity buffer 128. This process repeats until all the user data units to be written to a given stripe have been processed. Similarly, second parity calculation circuitry 124 transmits, at 132, the calculated second parity value to second parity buffer 134 which, like first parity buffer 128, is initialized with a value of '0'. As second parity calculation circuitry 124 processes each user data unit, the current value stored in second parity buffer 134 is transmitted, at 136, to second parity calculation circuitry 124, which updates the received second parity value using the value of the current user data unit, and transmits, at 132, the updated second parity value back to second parity buffer 134.

First parity calculation circuitry 120 calculates the first parity value P by XORing together all user data units which, in a Galois Field, is equivalent to adding the value of each data unit together. Thus, the first parity calculation can be represented by the following formula:

$$P = \sum_{t=0}^{n-1} UD_t \qquad \text{(Eq. 1)}$$

Second parity calculation circuitry 124 calculates the second parity value Q by XORing, or adding, the value of each user data unit, in the set of data units to be written to the RAID stripe, multiplied by the primitive element α of the finite field raised to the power of the ordinal number of the current user data unit being processed. A primitive element of a finite field is a number that can be used in a polynomial to express each value in the finite field. For example, in a 0-indexed list of user data units, the first data unit $UD_0$ is multiplied by $\alpha^0$, the second data unit $UD_1$ is multiplied by $\alpha^1$, the third data unit $UD_2$ is multiplied by $\alpha^2$, and so on. Thus, the second parity calculation can be represented by the following formula:

$$Q = \sum_{t=0}^{n-1} UD_t \alpha^t \quad \text{(Eq. 2)}$$

The second parity value Q, being a polynomial expression, can thus be evaluated using Horner's method. Horner's method is a method for finding the roots of a polynomial equation. This method can be used to evaluate a polynomial of any degree using only addition and multiplication operations.

Once all user data units for a given stripe have been processed, and the first and second parity values have been calculated, first parity buffer 128 transmits, at 138, the first parity value to encoding circuitry 110. Encoding circuitry 110 encodes the first parity value for storage, and transmits, at 112, the encoded first parity value to non-volatile memory 114 where the encoded first parity value is stored as encoded first parity data unit 116-$p$. Similarly, second parity buffer 134 transmits, at 140, the second parity value to encoding circuitry 110, which encodes the second parity value and transmits, at 112, the encoded second parity value for storage in non-volatile memory 114 as encoded second parity data unit 116-$q$.

Figure 2:
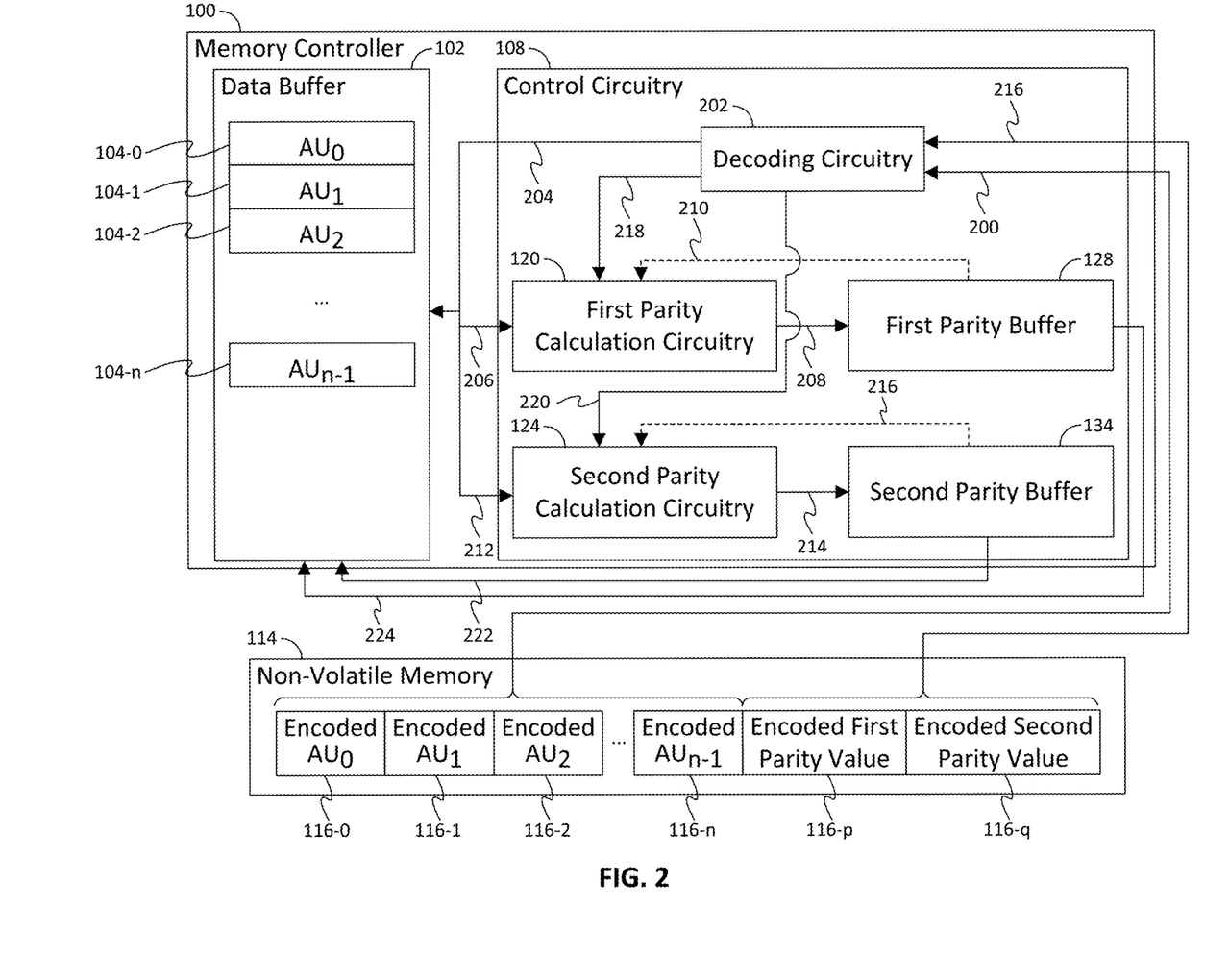
FIG. 2 is a block diagram illustrating components of a memory controller and data flow to, from, and within the memory controller for reading data units and recovering from a failure of two data units after forming a RAID stripe as in FIG. 1, in accordance with some implementations of the subject matter of the present disclosure.

FIG. 2 is a block diagram illustrating components of a memory controller and data flow to, from, and within the memory controller for reading data units and recovering from a failure of two data units in accordance with some implementations of the subject matter of the present disclosure. User data units are retrieved from non-volatile memory 114 and transmitted, at 200, to memory controller 100 where they are received at decoding circuitry 202. Decoding circuitry 202 may be a separate from, or combined with, encoding circuitry 110. Decoding circuitry 202 may be an ECC decoder, CRC decoder, or other suitable decoder configured to decode data units encoded by encoding circuitry 110. As each user data unit is decoded, it is transmitted, at 204, to data buffer 102. The decoded user data unit is also transmitted, at 206, to first parity calculation circuitry 120, which calculates a first parity value according to Equation 1, above, and transmits, at 208, the first parity value to first parity buffer 128. For each new data unit received by first parity calculation circuitry 120, the current value stored in first parity buffer 128 is transmitted, at 210, to first parity calculation circuitry 120, where it is combined, according to Equation 1, which the value of the current user data unit. Similarly, the decoded user data unit is transmitted, at 212, to second parity calculation circuitry 124, which calculated a second parity value using Equation 2, above. The second parity value is transmitted, at 214, to second parity buffer 134. As each data unit is received at second parity calculation circuitry 124, the current value stored in second parity buffer 134 is transmitted, at 216, to second parity calculation circuitry 124, where it is combined with the value of the current user data unit, according to Equation 2.

If either the first parity value or the second parity value fails, the user data units stored in the RAID stripe, and which were initially user to calculate the first parity value and the second parity value, can be used to recalculate the failed parity value, using Equation 1 or Equation 2, above, as needed. If any single user data unit among a set of data units fails, either of the first and second parity values can be retrieved from non-volatile memory 114 and transmitted, at 216, to memory controller 100. Once decoded using decoding circuitry 202, the retrieved parity value is transmitted to the appropriate calculation circuitry. If the first parity value was retrieved, it is transmitted, at 218, from decoding circuitry 202 to first parity calculation circuitry 120. If the second parity value was retrieved, it is transmitted, at 220, from decoding circuitry 202 to second parity calculation circuitry 124. If two user data units fail, both the first and second parity values are retrieved from non-volatile memory 114. Using the retrieved parity values and the values of the remaining user data units that were successfully decoded, the failed user data units can be recovered. For example, the first parity value is calculated as the sum of all user data units to be written to the RAID stripe. Thus, if the first parity value is used to recover a single failed data unit $UD_i$, first parity calculation circuitry 120 subtracts the sum of the valid user data units from the first parity value P, according to the following formula:

$$UD_i = P - \sum_{\substack{t=0 \\ t \neq i}}^{n-1} UD_t \quad \text{(Eq. 3)}$$

In a Galois Field $GF(2^m)$, adding these values together, rather than subtracting one from the other, provides the same result. Thus, in the case of a Galois Field $GF(2^m)$, the failed data unit $UD_i$ can be recovered using the following formula, which is equivalent to Equation 3, above:

$$UD_i = P - \sum_{\substack{t=0 \\ t \neq i}}^{n-1} UD_t \quad \text{(Eq. 4)}$$

Due to the nature of Galois Fields $GF(2^m)$, adding these values provides the same result as subtracting these values from each other. Thus, the sum of the values of the valid data units added to the first parity value (or subtracted therefrom) provides the value of the failed data unit. If the second parity data unit also fails, the user data unit recovered using the first parity value can be used to recalculate the second parity data using Equation 2, above.

The second parity value can also be used to recover a single failed data unit. Second parity calculation circuitry 124 calculates auxiliary second parity data $Q_i$, using the following formula:

$$Q_i = \sum_{\substack{t=0 \\ t \neq i}}^{n-1} UD_t \alpha^t \quad \text{(Eq. 5)}$$

The failed data unit $UD_i$ can then be recovered using the following formula:

$$UD_i = \frac{Q - Q_i}{\alpha^i} \quad \text{(Eq. 6)}$$

In a finite field $GF(2^m)$, Equation 6 is equivalent to the following:

$$UD_i = \frac{Q - Q_i}{\alpha^{2^m - i}} \quad \text{(Eq. 7)}$$

Additionally, if the first parity data unit also fails, it can be recalculated using the recovered user data unit and the remaining valid user data units.

If two user data units fail, the first and second parity value can be user to recover them. First, auxiliary parity values $P_{i,j}$ and $Q_{i,j}$ are calculated using Equations 1 and Equation 2, respectively, skipping failed user data units $UD_i$ and $UD_j$ during the calculation. This can be understood with reference to the following formulas:

$$P_{i,j} = \sum_{\substack{t=0 \\ t \neq i,j}}^{n-1} UD_t \quad \text{(Eq. 8)}$$

$$Q_{i,j} = \sum_{\substack{t=0 \\ t \neq i,j}}^{n-1} UD_t \alpha^t \quad \text{(Eq. 9)}$$

$UD_j$ can be recovered by applying scaling factors to the sum of the first parity value and the first auxiliary parity value and to the sum of the second parity value and the second auxiliary parity value. A first scaling factor S applied to the first parity value P is defined by the following formula:

$$S = \frac{\alpha^i}{\alpha^i - \alpha^j} \quad \text{(Eq. 10)}$$

In a Galois Field $GF(2^m)$, since addition is the same as subtraction, the equivalent value can be calculated using the following formula:

$$S = \frac{\alpha^i}{\alpha^i + \alpha^j} \quad \text{(Eq. 11)}$$

A second scaling factor T applied to the second parity value is defined by the following formula:

$$T = \frac{1}{1 - \alpha^j} \quad \text{(Eq. 12)}$$

In a Galois Field $GF(2^m)$, since addition is the same as subtraction, the equivalent value can be calculated using the following formula:

$$T = \frac{1}{1 + \alpha^j} \quad \text{(Eq. 13)}$$

Calculation of exponents can often be a processor-intensive process. In an implementation, in order to reduce the load on control circuitry 108, a lookup table is stored in a memory location within memory controller 100. The lookup table may include the values for the expression $(1+\alpha^{j-i})^{-1}$ for each possible combination of i and j. This expression can be manipulated to obtain the value of S as expressed in Equation 10 by multiplying both the numerator and the denominator by $\alpha^i$, as follows:

$$S = \frac{1}{1 + \alpha^{j-i}} \times \frac{\alpha^i}{\alpha^i} = \frac{\alpha^i}{\alpha^i + \alpha^j} \quad \text{(Eq. 14)}$$

The lookup table expression can be multiplied by $\alpha^{-i}$ to obtain the value of T as expressed in Equation 12 as follows:

$$T = \frac{1}{1 + \alpha^{j-i}} \times \frac{1}{\alpha^i} = \frac{1}{\alpha^i + \alpha^j} \quad \text{(Eq. 15)}$$

The value of $UD_j$ can then be calculated using the following formula:

$$UD_j = S(P - P_{i,j}) - T(Q - Q_{i,j}) \quad \text{(Eq. 16)}$$

In a Galois Field $GF(2^m)$, since addition is the same as subtraction, the equivalent value can be calculated using the following formula:

$$ID_j = S(P + P_{i,j}) + T(Q + Q_{i,j}) \quad \text{(Eq. 17)}$$

Once $UD_j$ has been recovered, $UD_i$ can be recovered using Equation 3 as described above.

In the event of a failure of two user data units and either the first parity data unit or the second parity data unit, making a total of three failed data units, the failed data cannot be recovered. Similarly, if there is a failure of a single data unit and both the first parity data unit and the second parity data unit, the failed data cannot be recovered.

Figure 3:
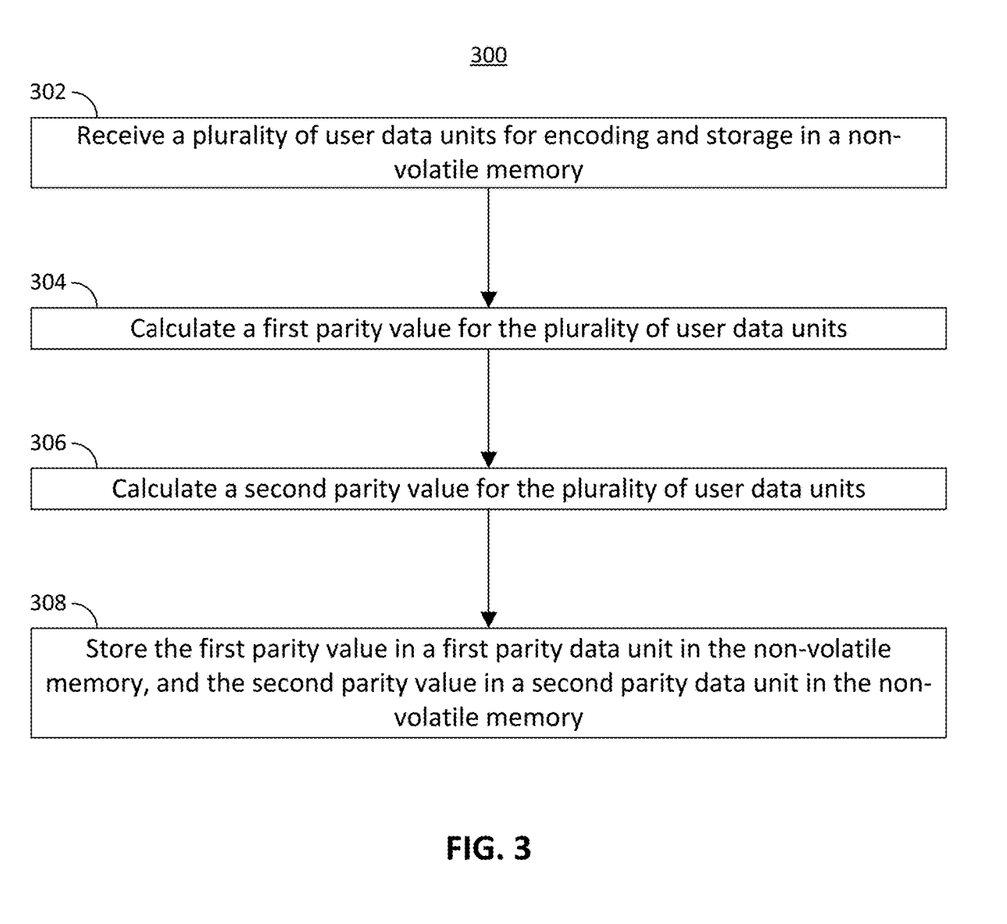
FIG. 3 is a flow diagram representing a process for enabling recovery from a failure of up to two data units in the memory controller of FIGS. 1 and 2, in accordance with some implementations of the subject matter of the present disclosure.

FIG. 3 is a flow diagram representing an illustrative process 300 for enabling recovery from a failure of up to two data units in accordance with some implementations of the subject matter of the present disclosure. At 302, memory controller 100 receives a plurality of user data units for encoding and storage in non-volatile memory 114. The user data units may be received from a host device that is communicatively coupled to memory controller 100, or may be received via a network connection, such as a LAN, a WAN, or the Internet, through which a host device is able to transmit data units to memory controller 100.

At 304, memory controller 100, using first parity calculation circuitry 120 of control circuitry 108, calculates a first parity value based on the plurality of user data units. As described above in connection with FIG. 1, first parity calculation circuitry 120 computes a running total of the values of each successive data unit according to Equation 1 and stores the current sum in first parity buffer 128. As each data unit is processed, first parity calculation circuitry 120 updates the current sum stored in first parity buffer 128 by retrieving the sum currently stored in first parity buffer 128 and adding to it the value of the current user data unit. The new sum is then stored in first parity buffer 128.

At 306, memory controller 100, using second parity calculation circuitry 124 of control circuitry 108, calculates a second parity value based on the plurality of user data units. As described above in connection with FIG. 1, second parity calculation circuitry 124 computes a running total of the values of each data unit multiplied by a given factor according to Equation 2 and stores the current sum in second parity buffer 134. As each data unit is processed, second parity calculation circuitry 124 updates the current sum stored in second parity buffer 134 by retrieving the current sum stored in second parity buffer 134 and adding to it the value of current user data unit multiplied by the appropriate factor. The new sum is then stored in second parity buffer 134.

At 308, once the number of user data units which fill the RAID stripe have been processed, the first parity value and the second parity value are stored in non-volatile memory 114. The first parity value is encoded, using encoding circuitry 110, and stored in non-volatile memory 114 as first parity data unit 116-$p$. The second parity value is similarly encoded, using encoding circuitry 110, and stored in non-volatile memory 114 as second parity data unit 116-$q$.

Figure 4A:
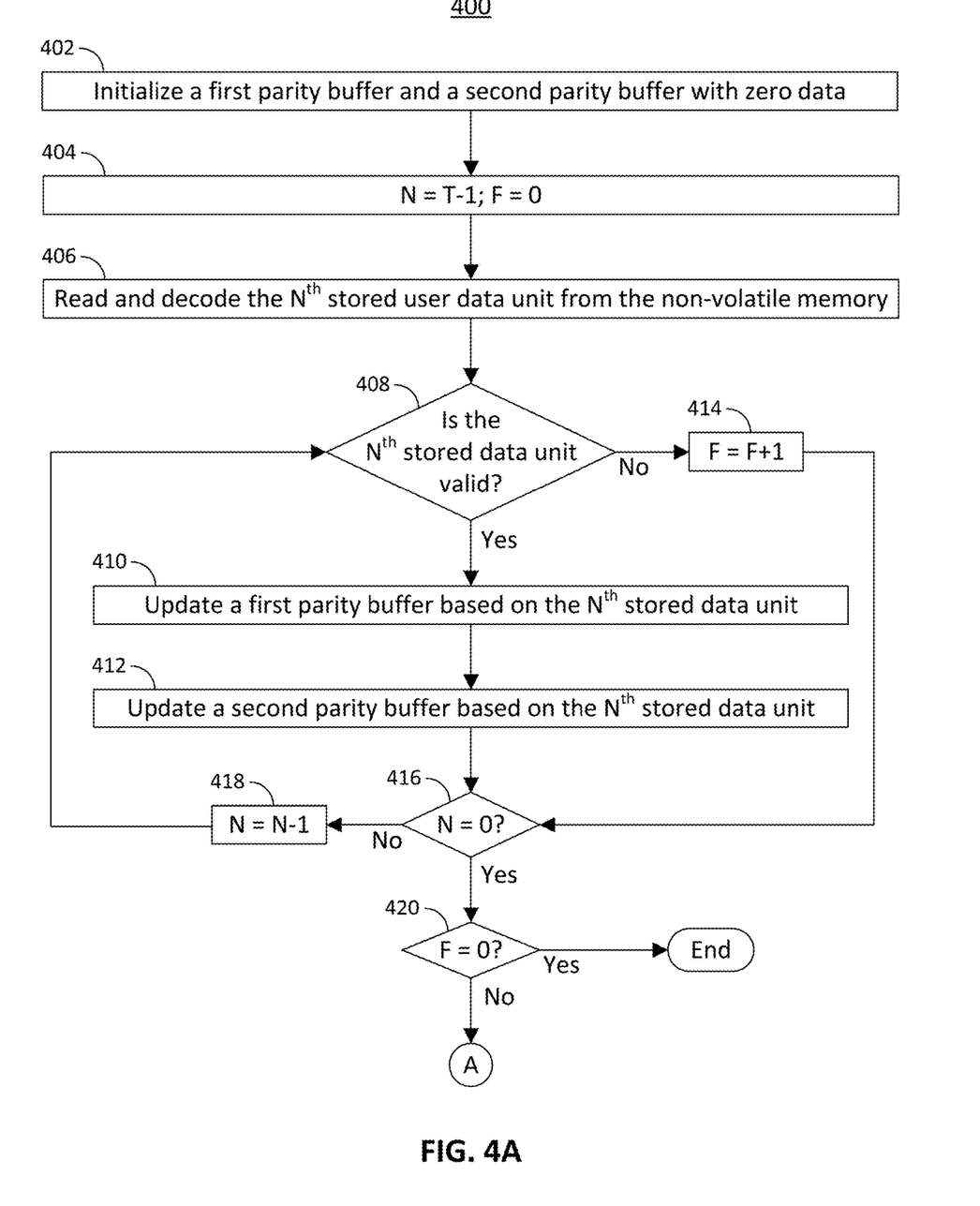
FIGS. 4A, 4B, and 4C (hereinafter collectively referred to as FIG. 4) are a flow diagram representing a process for recovering up to two failed user data units using the memory controller of FIGS. 1 and 2 in accordance with some implementations of the subject matter of the present disclosure.
Figure 4B:
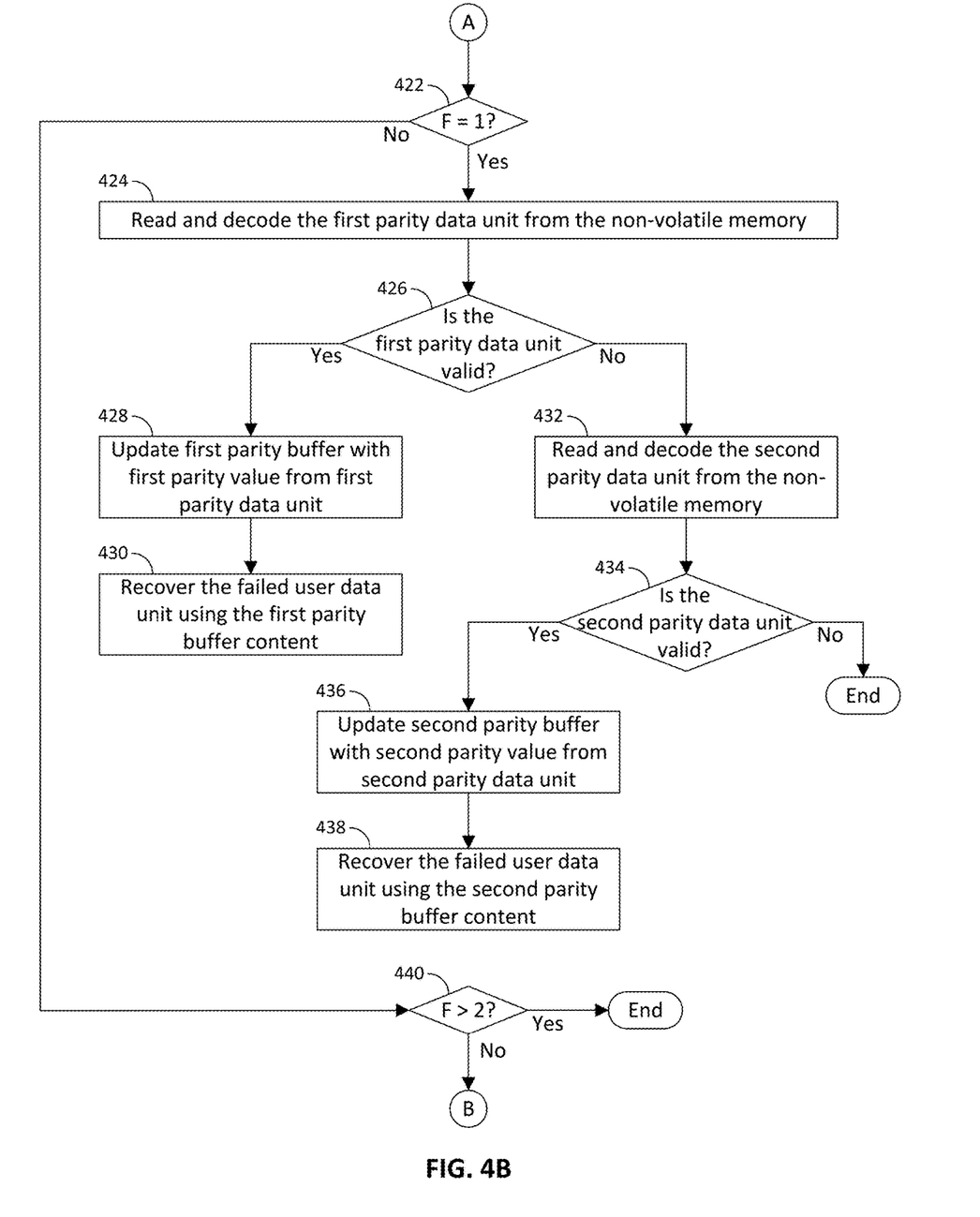
Figure 4C:
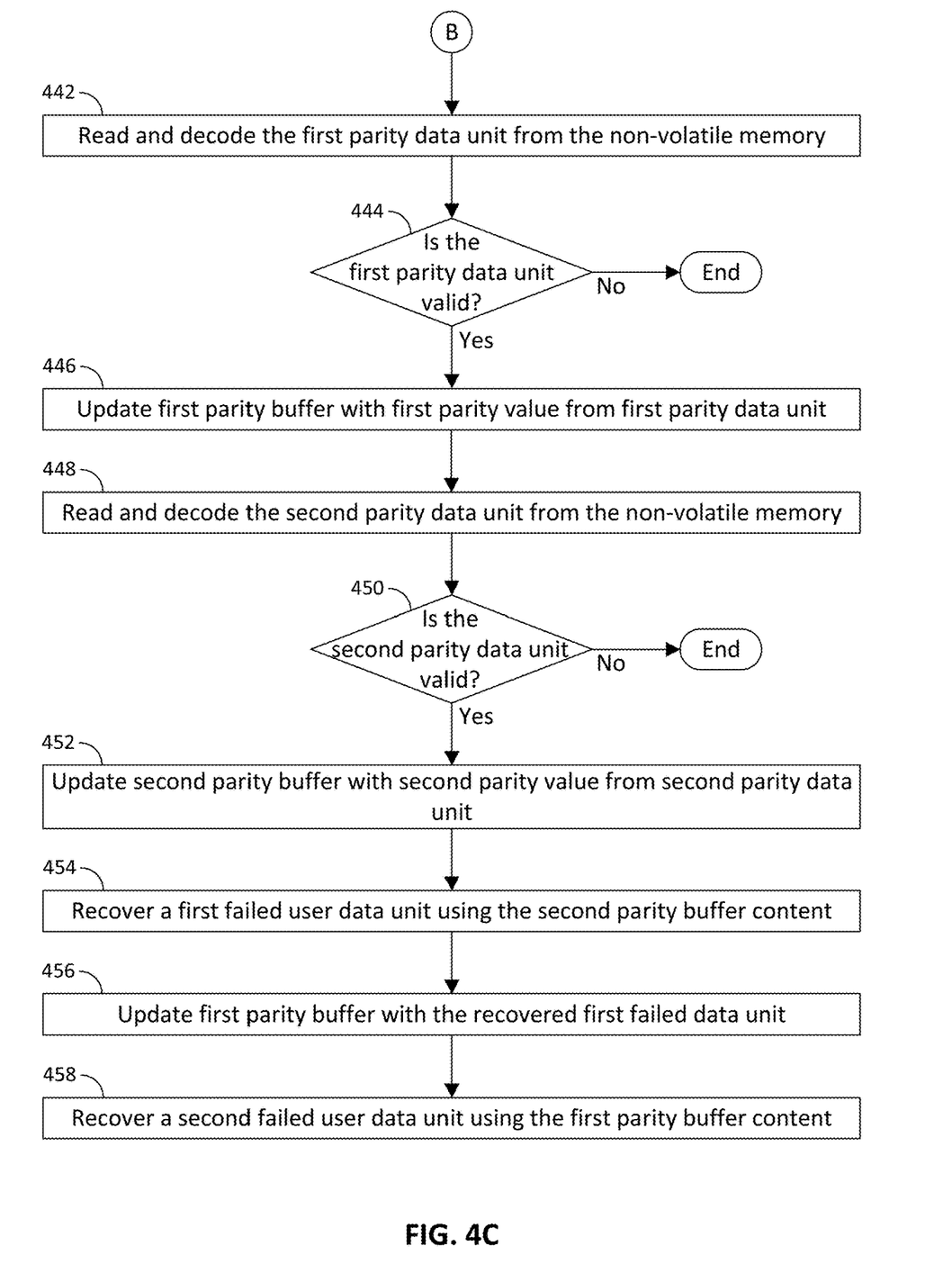

FIG. 4 is a flow diagram representing an illustrative process 400 for recovering up to two failed user data units in accordance with some embodiments of the subject matter of the present disclosure. More specifically, the process 400 describes recovery of two failed data units in the case where only user data units have failed and both the first parity data unit and the second parity data unit are valid. At 402, control circuitry 108 initializes first parity buffer 128 and second parity buffer 134, each with zero data. At 404, control circuitry 108 initializes a counter variable N, setting its value to one less than the total number of user data units in the RAID stripe to be read. Control circuitry 108 also initializes a second counter variable F to track the number of failed data units, setting its value to '0' before any read operations are executed.

At 406, control circuitry 108 reads from non-volatile memory 114 and, using decoding circuitry 202, decodes the $N^{th}$ user data unit. At 408, control circuitry 108 determines whether the $N^{th}$ data unit is valid. For example, control circuitry 108 determines whether decoding circuitry 202 has successfully decoded the $N^{th}$ user data unit. As another example, the $N^{th}$ user data unit may include a checksum against which the value of the $N^{th}$ data unit may be compared. Control circuitry 108 may determine whether the value of the $N^{th}$ data unit matches the checksum value.

If control circuitry 108 determines that the $N^{th}$ data unit is valid ("Yes" at 408), then, at 410, control circuitry 108, using first parity calculation circuitry 120, updates first parity buffer 128 based on the $N^{th}$ data unit using Equation 1, above. At 412, control circuitry 108, using second parity calculation circuitry 124, updates second parity buffer 134 based on the $N^{th}$ data unit using Equation 2, above.

If control circuitry 108 determines that the $N^{th}$ data unit is not valid ("No" at 408), then, at 414, control circuitry 108 increments the value of F by '1'. Control circuitry 108 thus tracks the number of data units which are not valid in order to determine if a recovery operation is needed.

After updating second parity buffer 134, or after incrementing the value of F, at 416, control circuitry 108 determines whether N is equal to '0', meaning that all data units in the stripe have been read. If not ("No" at 416), then, at 418, control circuitry 108 decrements the value of N by '1', and processing returns to 408.

If N is equal to zero ("Yes" at 416), then, at 420, control circuitry determines whether F is equal to '0'. If so ("Yes" at 420), meaning that no data units have failed, the process ends, as no recovery operations need to be executed. If F is not equal to '0' ("No" at 420), meaning at least one data unit has failed, then, at 422, control circuitry 108 determines whether F is equal to '1', meaning that only one data unit has failed. If so ("Yes" at 422), then, at 424, control circuitry 108 reads from non-volatile memory 114 and, using decoding circuitry 202, decodes first parity data unit 116-$p$.

At 426, control circuitry 108 determines whether first parity data unit 116-$p$ is valid. This may be accomplished using methods described above in connection with action 408. If first parity data unit 116-$p$ is valid ("Yes" at 426), then, at 428 control circuitry 108 updates first parity buffer 128 with the first parity value decoded from first parity data unit 116-$p$. At 430, control circuitry 108 recovers the failed user data unit based on the value stored in first parity buffer 128 according to the process described above in connection with FIG. 2, using Equation 3.

If first parity data unit 116-$p$ is not valid ("No" at 426), then, at 432, control circuitry 108 reads from non-volatile memory 114 and, using decoding circuitry 202, decodes second parity data unit 116-$q$. At 434, control circuitry 108 determines whether second parity data unit 116-$q$ is value. This may be accomplished using methods described above in connection with action 408. If second parity data unit 116-$q$ is not valid ("No" at 434), then the failed data unit cannot be recovered, and the process ends.

If second parity data unit 116-$q$ is valid ("Yes" at 434), then, at 436, control circuitry 108 updates second parity buffer 134 with the second parity value decoded from second parity data unit 116-$q$. At 438, control circuitry 108 recovers the failed user data unit based on the value stored in second parity data unit 134 according to the process described above in connection with FIG. 2, using Equations 5-7.

If the value of F is not equal to '1' ("No" at 422), then, at 440, control circuitry 108 determines whether F is greater than '2', meaning that more than two data units have failed. If F is greater than '2' ("Yes" at 440), then the failed data units cannot be recovered, and the process ends. If F is not greater than '2' ("No" at 440), then, at 442, control circuitry 108 reads from non-volatile memory 114 and, using decoding circuitry 202, decodes first parity data unit 116-$p$. At 444, control circuitry 108 determines whether first parity data unit 116-$p$ is valid. This may be accomplished using methods described above in connection with action 408. If first parity data unit 116-$p$ is not valid ("No" at 444), then the failed data units cannot be recovered, and the process ends. If first parity data unit 116-$p$ is valid ("Yes" at 444), then, at 446 control circuitry 108 updates first parity buffer 128 with the first parity value decoded from first parity data unit 116-$p$.

At 448, control circuitry 108 reads from non-volatile memory 114 and, using decoding circuitry 202, decodes second parity data unit 116-$q$. At 450, control circuitry 108 determines whether second parity data unit 116-$q$ is valid. This may be accomplished using methods described above in connection with action 408. If second parity data unit 116-$q$ is not valid ("No" at 450), then the failed data units cannot be recovered, and the process ends. If second parity data unit 116-$q$ is valid ("Yes" at 450), then, at 452 control circuitry 108 updates second parity buffer 134 with the second parity value decoded from second parity data unit 116-$q$.

At 454, control circuitry 108 recovers one failed data unit based on the two parity values according to the methods described above in connection with FIG. 2 using Equations 8-17. At 456, control circuitry 108 updates first parity buffer 128 based on the recovered user data unit. At 458, the second failed user data unit is recovered based on the first parity buffer, as described above in connection with FIG. 2, using Equation 3.

Figure 5A:
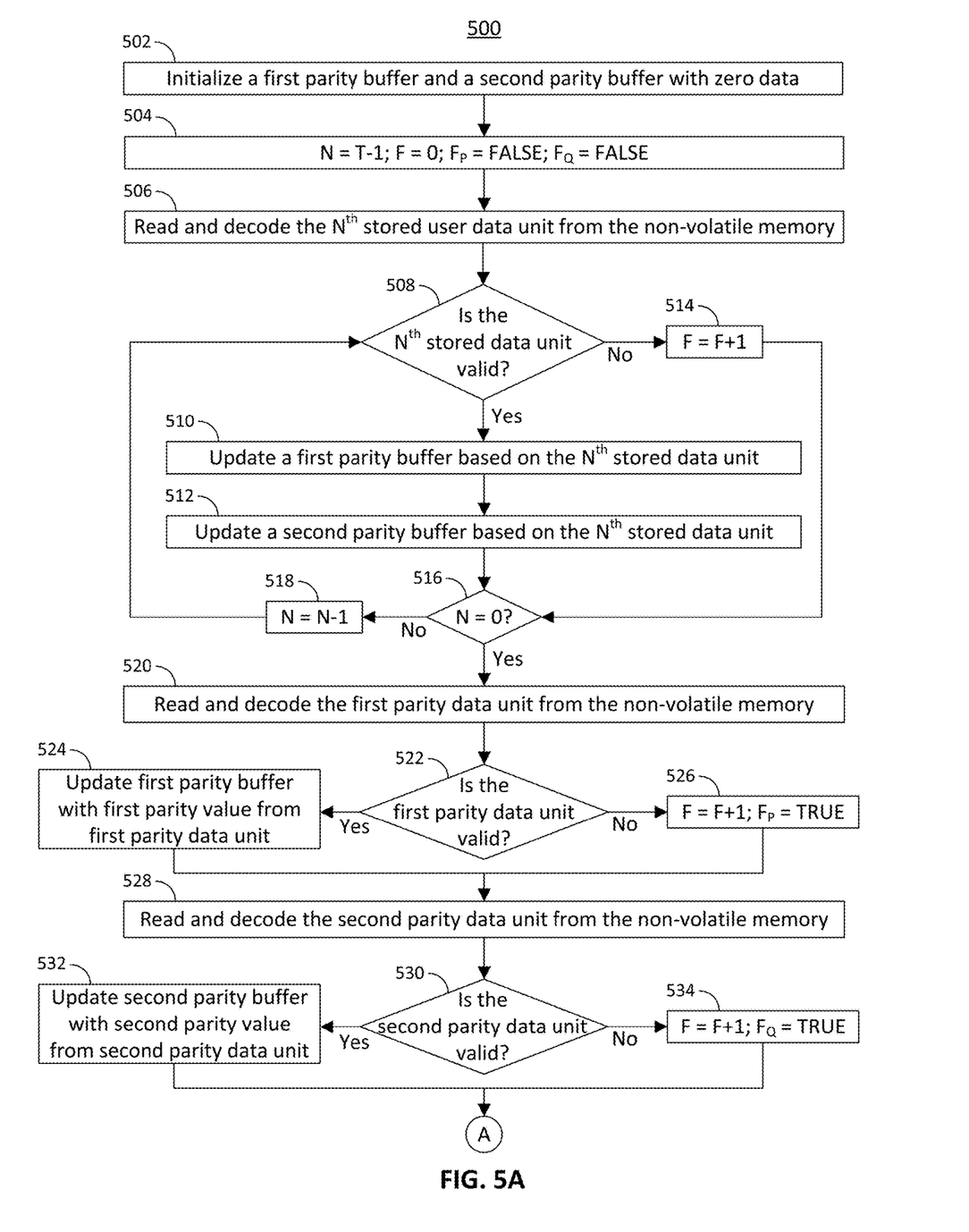
FIGS. 5A, 5B, and 5C (hereinafter collectively referred to as FIG. 5) are a flow diagram representing a process for recovering up to two data units, including user data units and parity data units, using the memory controller of FIGS. 1 and 2 in accordance with some implementations of the subject matter of the present disclosure.
Figure 5B:
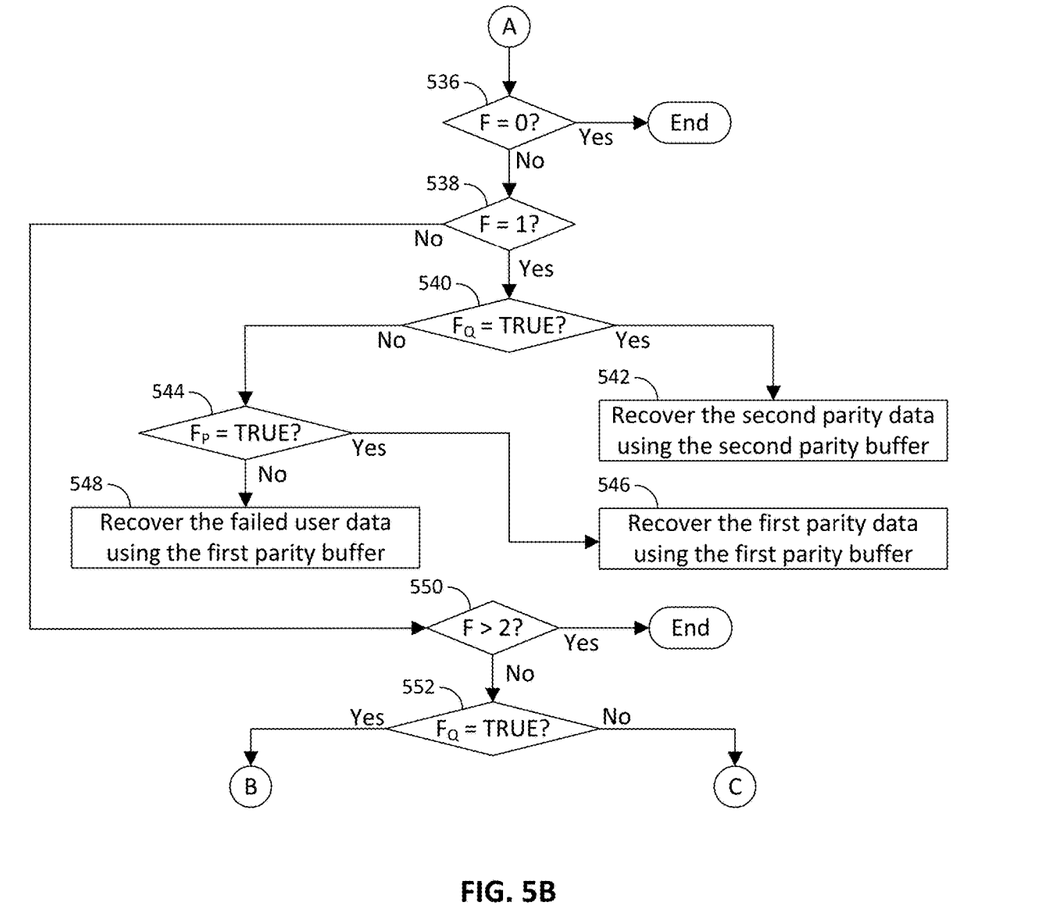
Figure 5C:
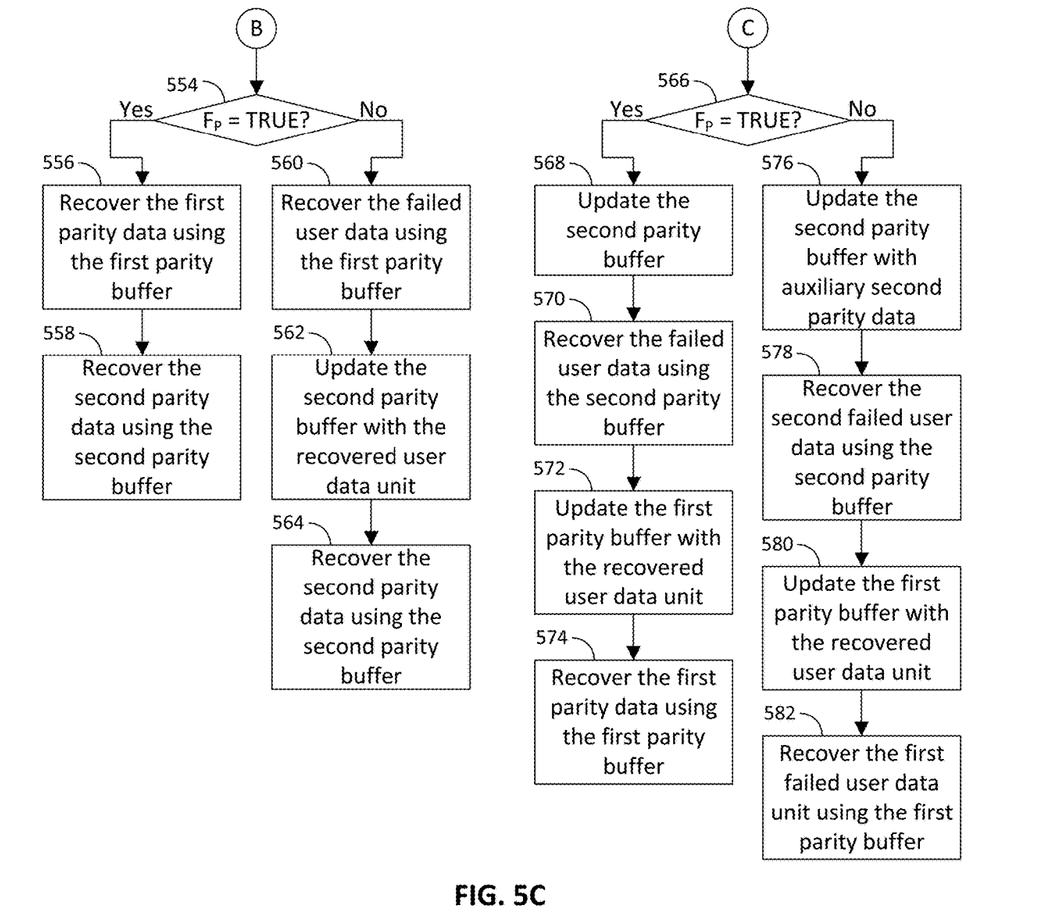

FIG. 5 is a flow diagram representing an illustrative process 500 for recovering up to two data units, including user data units and parity data units in accordance with some embodiments of the subject matter of the present disclosure. More specifically, in contrast to process 400 described above in connection with FIG. 4, which shows recovery of two failed data units in the case where only user data units have failed and both the first parity data unit and the second parity data unit are valid, process 500 describes recovery of two failed data units wherein one or more of the failed data units is a parity data unit. At 502, control circuitry 108 initializes first parity buffer 128 and second parity buffer 134, each with zero data. At 504, control circuitry 108 initializes a counter variable N, setting its value to one less than the total number of user data units in the RAID stripe to be read; a second counter variable F, representing the number of failed data units, setting its value to '0'; a flag or Boolean variable $F_P$, indicating whether first parity data unit 116-$p$ has failed, setting its value to FALSE; and a flag or Boolean variable $F_Q$, indicating whether second parity data unit 116-$q$ has failed, setting its value to FALSE.

At 506, control circuitry 108 reads, from non-volatile memory 114, and decodes, using decoding circuitry 202, the $N^{th}$ user data unit. At 508, control circuitry 108 determines whether the $N^{th}$ data unit is valid. For example, control circuitry 108 determines whether decoding circuitry 202 has successfully decoded the $N^{th}$ user data unit. As another example, the $N^{th}$ user data unit may include a checksum against which the value of the $N^{th}$ data unit may be compared. Control circuitry 108 may determine whether the value of the $N^{th}$ data unit matches the checksum value.

If control circuitry 108 determines that the $N^{th}$ user data unit is valid ("Yes" at 508), then, at 510, control circuitry 108, using first parity calculation circuitry 120, updates first parity buffer 128 based on the $N^{th}$ data unit using Equation 1, above. At 512, control circuitry 108, using second parity calculation circuitry 124, updates second parity buffer 134 based on the $N^{th}$ data unit using Equation 2, above.

If control circuitry 108 determines that the $N^{th}$ data unit is not valid ("No" at 508), then, at 514, control circuitry 108 increments the value of F by '1'. Control circuitry 108 thus tracks the number of data units which are not valid in order to determine if a recovery operation is needed.

After updating second parity buffer 134, or after incrementing the value of F, at 516, control circuitry 108 determines whether N is equal to '0', meaning that all data units in the stripe have been read. If not ("No" at 516), then, at 518, control circuitry 108 decrements the value of N by '1', and processing returns to 508.

If N is equal to '0' ("Yes" at 516), then, at 520, control circuitry 108 reads from non-volatile memory 114 and, using decoding circuitry 202, decodes first parity data unit 116-$p$. At 522, control circuitry 108 determines whether first parity data unit 116-$p$ is valid. This may be accomplished using methods described above in connection with action 408. If first parity data unit 116-$p$ is valid ("Yes" at 522), then, at 524 control circuitry 108 updates first parity buffer 128 with the first parity value decoded from first parity data unit 116-$p$. If the first parity value is not valid ("No" at 522), then, at 526, control circuitry 108 increments the value of F by '1' and sets the value of $F_P$ to TRUE, indicating that the first parity value has failed.

In either case, processing continues at 528, at which control circuitry 108 reads from non-volatile memory 114 and, using decoding circuitry 202, decodes second parity data unit 116-$q$. At 530, control circuitry 108 determines whether second parity data unit 116-$q$ is valid. This may be accomplished using methods described above in connection with action 408. If first parity data unit 116-$q$ is valid ("Yes" at 520), then, at 532 control circuitry 108 updates second parity buffer 134 with the second parity value decoded from second parity data unit 116-$q$. If the second parity value is not valid ("No" at 530), then, at 534, control circuitry 108 increments the value of F by '1' and sets the value of $F_Q$ to TRUE, indicating that the second parity value has failed.

In either case, processing continues at 536, at which control circuitry 108 determines whether F is equal to '0', meaning that no data units have failed. If F is equal to '0' ("Yes" at 536), then no recovery actions are needed, and the process ends. If F is not equal to '0' ("No" at 536), meaning that at least one data unit from among the plurality of user data units and the first and second parity data units has failed, then, at 538, control circuitry 108 determines whether F is equal to '1', meaning that a single data unit has failed. If F is equal to '1' ("Yes" at 538), then, at 540, control circuitry 108 checks the value of $F_Q$ to determine whether second parity data unit 116-$q$ has failed. If $F_Q$ is TRUE ("Yes" at 540), meaning that second parity data unit 116-$q$ has failed, then, at 542, control circuitry 108 recovers the second parity data using second parity buffer 134.

If $F_Q$ is FALSE ("No" at 540), then, at 544, control circuitry 108 checks the value of $F_P$ to determine whether first parity data unit 116-$p$ has failed. If $F_P$ is TRUE ("Yes" at 544), meaning that first parity data unit 116-$p$ has failed, then, at 546, control circuitry 108 recovers the first parity data using first parity buffer 128.

If $F_P$ is FALSE ("No" at 544), then the failed data unit is determined to be a user data unit and, at 548, control circuitry 108 recovers the failed user data unit based on the first parity buffer according to the method described above in connection with FIG. 2, using Equation 3, above.

If F is not equal to '1' ("No" at 538), then, at 550, control circuitry 108 determines whether F is greater than '2', meaning that more than two data units have failed. If F is greater than '2' ("Yes" at 550), then the failed data units cannot be recovered, and the process ends. If F is not greater than '2' ("No" at 550), then, at 552, control circuitry 108 checks the value of $F_Q$ to determine whether second parity data unit 116-$q$ has failed.

If $F_Q$ is TRUE ("Yes" at 552), meaning that second parity data unit 116-$q$ has failed, then, at 554, control circuitry 108 checks the value of $F_P$ to determine whether first parity data unit 116-$p$ has also failed. If $F_P$ is TRUE ("Yes" at 554), meaning that first parity data unit 116-$p$ has failed, then both parity values need to be recovered. At 556, control circuitry 108 recovers the first parity value using first parity buffer 128. Then, at 558, control circuitry 108 recovers the second parity value using second parity buffer 134. If $F_P$ is FALSE ("No" at 554), meaning that first parity data unit 116-$p$ is valid, then the second parity value and one user data unit need to be recovered. At 560, control circuitry 108 recovers the failed user data based on the first parity buffer according to the method described above in connection with FIG. 2, using Equation 3. At 562, control circuitry 108 updates second parity buffer 134 with the value of the recovered user data unit according to the method described above in connection with FIG. 2, using Equation 2. Then, at 564, control circuitry 108 recovers the second parity value using second parity buffer 134.

If $F_Q$ is FALSE ("No" at 552), meaning that second parity data unit 116-$q$ is valid, then, at 566, control circuitry 108 checks the value of $F_P$ to determine whether first parity data unit 116-$p$ has also failed. If $F_P$ is TRUE ("Yes" at 566), meaning that first parity data unit 116-$p$ has failed, then the first parity value and one user data unit need to be recovered. At 568, control circuitry 108 updates second parity buffer 134 by multiplying the value stored in second parity buffer 134 by $\alpha^{-i}$, where i is the zero-based index number of the failed user data unit. At 570, control circuitry 108 recovers the failed user data unit based on the value of second parity buffer 134. At 570, control circuitry 108 recovers the failed data unit based on the updated value of second parity buffer 134. At 572, control circuitry 108 updates first parity buffer 128 with the value of the recovered user data unit according to the method described above in connection with FIG. 2, using Equation 1. At 574, control circuitry 108 recovers the first parity value from the updated value stored in first parity buffer 128.

If $F_P$ is FALSE ("No" at 566), then both parity data units are valid and two user data units need to be recovered. At 576, control circuitry 108 updates second parity buffer 134 with auxiliary second parity data according to the method described above in connection with FIG. 2, using Equations 8-17. At 578, control circuitry 108 recovers one failed user data unit using on second parity buffer 134. At 580, control circuitry 108 updates first parity buffer 128 with the recovered user data unit according to the method described above in connection with FIG. 2, using Equation 1. At 582, control circuitry 108 recovers the other failed data unit using updated first parity buffer 128.

Various implementations discussed in conjunction with FIGS. 1-5 are performed by various electronic components of one or more electronic circuits, such as but not limited to an integrated circuit, and application-specific integrated circuit (ASIC), a digital signal processor (DSP), and/or the like. Various components discussed throughout this disclosure are configured to include a set of electronic circuit components, and communicatively operate on one or more electronic circuits. Each electronic circuit is configured to include any of, but not limited to logic gates, memory cells, amplifiers, filters, and/or the like.

While various implementations of the subject matter of the present disclosure have been shown and described herein, such implementations are provided by way of example only. Numerous variations, changes, and substitutions relating to implementations described herein are applicable without departing from the disclosure. It is noted that various alternatives to the implementations of the disclosure described herein may be employed in practicing the disclosure. It is intended that the following claims define the scope of the disclosure and that methods and structures within the scope of these claims and their equivalents be covered thereby.

The subject matter of this specification has been described in terms of particular aspects, but other aspects and variations can be implemented and are within the scope of the following claims.

What is claimed is:

1. A method for enabling recovery of failed data units from non-volatile memory using two parity values, the method comprising:
    calculating a first parity value for a plurality of user data units using a first parity calculation, the first parity calculation comprising a first series of operations;
    calculating a second parity value for the plurality of user data units using a second parity calculation, the second parity value being different from the first parity value, and the second parity calculation comprising a second series of operations;
    storing the first parity value in a first parity data unit in the non-volatile memory and the second parity value in a second parity data unit in the non-volatile memory;
    enabling recovery from a failure of up to two data units from among the plurality of user data units and the first and second parity data units by recalculating the value of the failed data units based on one or more of the first parity data unit, the second parity data unit, and the values of other user data units of the plurality of data units;
    retrieving the plurality of user data units from the non-volatile memory;
    decoding the retrieved user data units using an ECC decoder;
    determining, for each retrieved user data unit, whether the respective user data unit was successfully decoded;
    in response to determining that the respective user data unit was not successfully decoded:
        retrieving the first parity data unit from the non-volatile memory, and
        retrieving the second parity data unit from the non-volatile memory; and
    in response to determining that a second user data unit of the plurality of user data units was also not successfully decoded:
        calculating auxiliary first parity data using the first parity calculation,
        calculating auxiliary second parity data using the second parity calculation,
        calculating a first scaling factor for the auxiliary first parity data by dividing a primitive element of a finite field raised to a power corresponding to an index of the first user data unit by the sum of (a) the primitive element of the finite field raised to the power corresponding to the index of the first user data unit and (b) the primitive element raised to an index of the second user data unit,
        calculating a second scaling factor for the auxiliary second parity data by taking the inverse of one more than the primitive element raised to the power corresponding to the index of the second user data unit,
        recovering the second user data unit based on the first parity data unit, the auxiliary first parity data, the first scaling factor, the second parity data unit, the auxiliary second parity data, and the second scaling factor, and
        recovering the respective user data unit based on the recovered second user data unit, the first parity data unit, and the auxiliary first parity data.

2. The method of claim 1, further comprising:
in response to determining that the respective user data unit was successfully decoded:
    updating a first parity buffer based on the respective user data unit using the first parity calculation; and
    updating a second parity buffer based on the respective user data unit using the second parity calculation.

3. The method of claim 1, further comprising recovering the respective user data unit by recalculating the value of the respective data unit based on at least one of the first parity data unit and the second parity data unit.

4. The method of claim 1, further comprising:
decoding the first parity data unit using an ECC decoder;
determining whether the first parity data unit was successfully decoded;

decoding the second parity data unit using the ECC decoder;
determining whether the second parity data unit was successfully decoded; and
in response to determining that the first parity data unit was not successfully decoded and that the second parity data unit was successfully decoded:
calculating auxiliary second parity data from the values of user data units of the plurality of user data units that have been successfully decoded;
recovering the respective user data unit based on the second parity data unit and the auxiliary second parity data; and
recovering the first parity data unit based on the recovered user data unit and the remaining data units of the plurality of data units.

5. The method of claim 1, further comprising:
decoding the first parity data unit using an ECC decoder;
determining whether the first parity data unit was successfully decoded;
decoding the second parity data unit using the ECC decoder;
determining whether the second parity data unit was successfully decoded; and
in response to determining that the first parity data unit was successfully decoded and that the second parity data unit was not successfully decoded:
recovering the respective user data unit based on the first parity data unit; and
recovering the second parity data unit based on the recovered user data unit and the remaining user data units of the plurality of user data units.

6. The method of claim 1, wherein retrieving the first parity data unit from the non-volatile memory and retrieving the second parity data unit from the non-volatile memory occurs only after all user data units of the plurality of user data units have been retrieved.

7. The method of claim 1, wherein the first parity calculation is a sum of all user data units of the plurality of user data units.

8. The method of claim 1, wherein the second parity calculation is a polynomial function, wherein each user data unit is multiplied by an intermediate value.

9. The method of claim 8, wherein the polynomial function is evaluated using Horner's Method.

10. A memory controller enabling recovery of failed data units from non-volatile memory using two parity values, the memory controller comprising:
input/output circuitry configured to:
receive a plurality of user data units from a host device; and
store the plurality of user data units in non-volatile memory communicatively coupled to the memory controller; and
control circuitry configured to:
calculate a first parity value for the plurality of user data units using a first parity calculation, the first parity calculation comprising a first series of operations;
calculate a second parity value for the plurality of user data units using a second parity calculation, the second parity value being different from the first parity value, and the second parity calculation comprising a second series of operations;
store, using the input/output circuitry, the first parity value in a first parity data unit in the non-volatile memory and the second parity value in a second parity data unit in the non-volatile memory;
enable recovery from a failure of up to two data units from among the plurality of user data units and the first and second parity data units by recalculating the value of the failed data units based on one or more of the first parity data unit, the second parity data unit, and the values of other user data units of the plurality of data units;
retrieve, using the input/output circuitry, the plurality of user data units from the non-volatile memory;
decode the retrieved user data units using an ECC decoder; determine, for each retrieved user data unit, whether the respective user data unit was successfully decoded;
in response to determining that the respective user data unit was not successfully decoded:
retrieve, using the input/output circuitry, the first parity data unit from the non-volatile memory, and
retrieve, using the input/output circuitry, the second parity data unit from the non-volatile memory; and
in response to determining that a second user data unit of the plurality of user data units was also not successfully decoded:
calculate auxiliary first parity data using the first parity calculation,
calculate auxiliary second parity data using the second parity calculation,
calculate a first scaling factor for the auxiliary first parity data by dividing a primitive element of a finite field raised to a power corresponding to an index of the first user data unit by the sum of (a) the primitive element raised to the power corresponding to the index of the first user data unit and (b) the primitive element raised to a power corresponding to an index of the second user data unit,
calculate a second scaling factor for the auxiliary second parity data by taking the inverse of one more than the primitive element raised to the power corresponding to the index of the second user data unit,
recover the second user data unit based on the first parity data unit, the auxiliary first parity data, the first scaling factor, the second parity data unit, the auxiliary second parity data, and the second scaling factor, and
recover the respective user data unit based on the recovered second user data unit, the first parity data unit, and the auxiliary first parity data.

11. The memory controller of claim 10, wherein the control circuitry is further configured to:
in response to determining that the respective user data unit was successfully decoded:
update a first parity buffer based on the respective user data unit using the first parity calculation; and
update a second parity buffer based on the respective user data unit using the second parity calculation.

12. The memory controller of claim 11, wherein the control circuitry is further configured to recover the respective user data unit by recalculating the value of the respective data unit based on at least one of the first parity data unit and the second parity data unit.

13. The memory controller of claim 10, wherein the control circuitry is further configured to:
decode the first parity data unit using an ECC decoder;
determine whether the first parity data unit was successfully decoded;
decode the second parity data unit using the ECC decoder;

determine whether the second parity data unit was successfully decoded; and in response to determining that the first parity data unit was not successfully decoded and that the second parity data unit was successfully decoded:

calculate auxiliary second parity data from the values of user data units of the plurality of user data units that have been successfully decoded;

recover the respective user data unit based on the second parity data unit and the auxiliary second parity data; and     recover the first parity data unit based on the recovered user data unit and the remaining data units of the plurality of data units.

14. The memory controller of claim 10, wherein the control circuitry is further configured to:

decode the first parity data unit using an ECC decoder;

determine whether the first parity data unit was successfully decoded;

decode the second parity data unit using the ECC decoder;

determine whether the second parity data unit was successfully decoded; and in response to determining that the first parity data unit was successfully decoded and that the second parity data unit was not successfully decoded:

recover the respective user data unit based on the first parity data unit; and     recover the second parity data unit based on the recovered user data unit and the remaining user data units of the plurality of user data units.

15. The memory controller of claim 10, wherein the control circuitry configured to retrieve, using the input/output circuitry, the first parity data unit from the non-volatile memory and retrieve, using the input/output circuitry, the second parity data unit from the non-volatile memory only after all user data units of the plurality of user data units have been retrieved.

16. The memory controller of claim 10, wherein the first parity calculation is a sum of all user data units of the plurality of user data units.

17. The memory controller of claim 10, wherein the second parity calculation is a polynomial function, wherein each user data unit is multiplied by an intermediate value.

18. The memory controller of claim 17, wherein the polynomial function is evaluated using Horner's Method.

* * * * *